(No Model.) 2 Sheets—Sheet 1.

W. H. CARPENTER.
CAMERA TRIPOD.

No. 370,240. Patented Sept. 20, 1887.

Witnesses
E. S. Bowen.
Wm. Cassler

Inventor
William Henry Carpenter
Per A. G. Fuller
Attorney (No Model.) 2 Sheets—Sheet 2.
W. H. CARPENTER.
CAMERA TRIPOD.
No. 370,240. Patented Sept. 20, 1887.
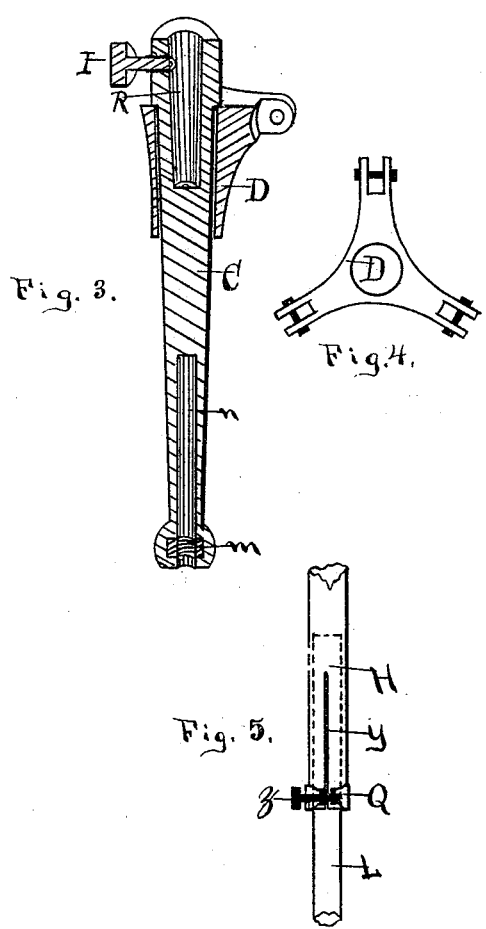
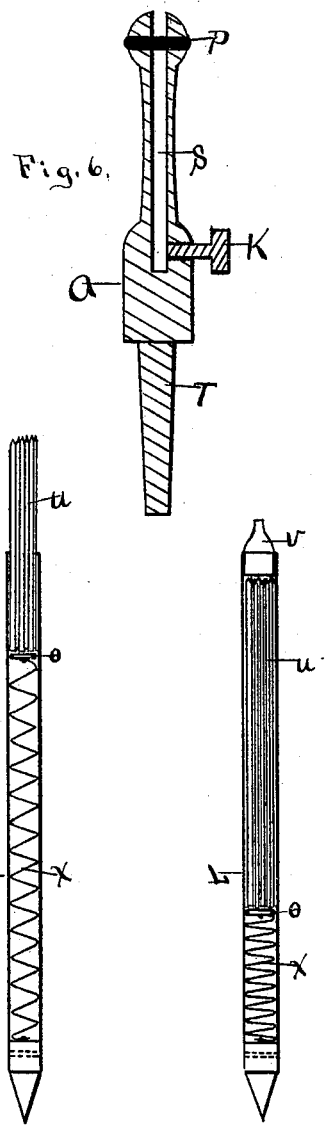
Witnesses
E. J. Bown
Wm. Cassler
Inventor
William Henry Carpenter
Per A. G. Fuller
attorney.

United States Patent Office.

WILLIAM HENERY CARPENTER, OF CADILLAC, MICHIGAN.

CAMERA-TRIPOD.

SPECIFICATION forming part of Letters Patent No. 370,240, dated September 20, 1887.

Application filed December 13, 1886. Serial No. 221,468. (No model.)

*To all whom it may concern:*

Be it known that I, WILLIAM HENERY CARPENTER, a citizen of the United States, residing at the city of Cadillac, county of Wexford, and State of Michigan, have invented a new and useful Camera-Tripod, of which the following is a full and exact description and specification.

My invention relates to improvements in camera-tripods, whereby the head of said tripod to which the camera is attached is fixed upon both a vertical and horizontal axis, and is thus adapted to be revolved horizontally and partially vertically to facilitate the adjustment of the camera in bringing the object to the center of the ground without altering the focus or moving the legs of the tripod, as is necessary in camera-tripods now in use; also by making the legs of the camera-tripod more easily adjustable, and in adapting them by their material, form, and method of construction to be magazines or receptacles for carrying in a dark chamber, sensitized paper, pencils, &c. I attain these objects by means of the mechanism and arrangement of parts illustrated in the accompanying drawings, which are hereby made a part of this specification, in which—

Figure 1:
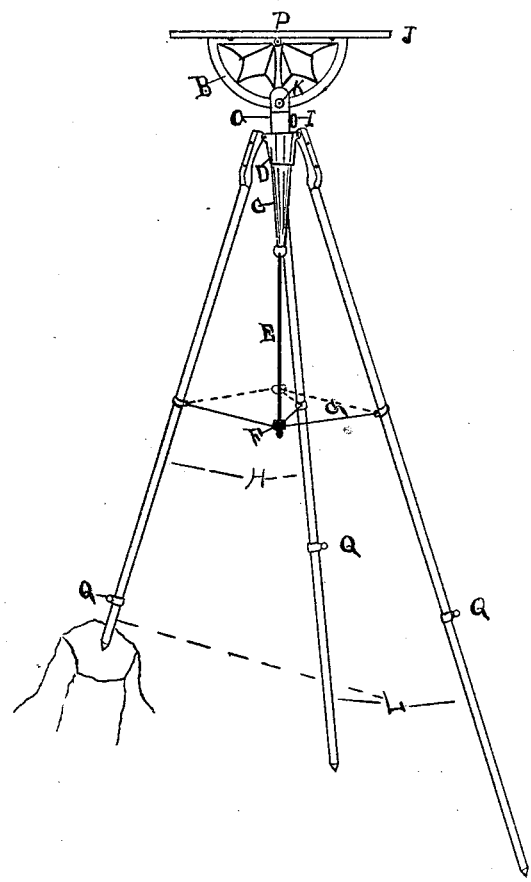
Figure 2:
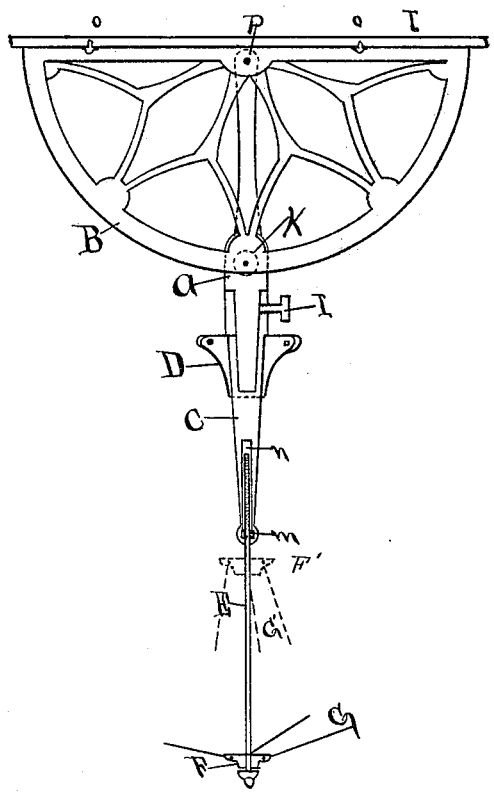

Figure 1 is a perspective view of my camera-tripod with one of the legs adjusted to fit an obstacle in setting. Fig. 2 is an enlarged view of the upper part of the tripod, supposed to be cut through the center to show the relation of the various parts of the head and the method of putting them together. Figs. 3, 4, and 6 show enlarged views of various parts of the head. Fig. 5 shows the mechanism by which the legs are made adjustable and the relation of their different parts. Figs. 7 and 8 show the adaptation of the legs to magazines.

In the different figures like letters refer to like parts.

The foundation of the tripod-head consists of a head, D, to which are attached in any convenient manner the upper portions of the legs H. Through the head D passes and closely fits the standard C, which has, as shown in Figs. 2 and 3, in its ends the circular sockets R and *n*. Fitting into the socket R by the circular tenon T is an extension, A, of the standard C, as shown in Fig. 6. In the standard C is a clamp-screw, J, adapted to hold the tenon T rigidly in the socket R when the adjustment of the camera is complete.

The upper portion of the piece A is divided by the slot S into two parts, between which is the semi-disk B, adapted to make a semi-revolution upon the bearing P. A is also provided with a set-screw, K, by which, when desired, B can be solidly fixed at any part of its arc. To the straight side of the semi-disk B is attached in any convenient manner, as by screws *o o*, the board or frame J, on which the camera is placed. In the standard C, at the lower end of the socket *n* and concentric with it, is embedded a nut or burr, *m*. Into this is screwed the rod E, which is enlarged into a head at its lower end. Fitting upon the rod E, but loosely, so that it may easily slip along it, is a small head, F, to which are attached by vertically-flexible joints the brace-rods G, which are attached by similar joints at their other end to the legs H. The rod E, being so adjusted that the head F, holding the brace-rods G, may fall just below its dead-center when the legs are extended, holds the legs firmly in their extended position, so that the tripod can be moved bodily, if desired, without the legs collapsing. When the head F is raised above its dead-center, as shown in Fig. 2 at F', the braces G offer no resistance, and the legs may be compactly folded in the ordinary manner.

The portion of the legs H has at its lower end for a few inches a slit, *y*, and at its extremity a clamp, Q, provided with a screw, *z*, to draw its ends tightly together to rigidly hold the portion L of the legs, which is a little smaller than the portion H, and thus adapted to slip inside of it. Both portions of the legs are preferably made of light brass tubing. The lower end of the portion L of the legs is provided with any suitable solid point to cause it to take hold firmly to whatever material the tripod may be set upon. The interior of one or more of the portions L of the legs is provided with a light firm coil-spring, X, with a plate at its upper end concentric with and of a size to fit the diameter of the tube, as shown in Figs. 7 and 8. The spring X, when relaxed, raises the plate and whatever may be placed in the tube to near its top, so that it can be easily taken out, as shown in Fig. 7. The spring may be compressed and the chamber or magazine made of any depth to fit whatever is put into the magazine, and the whole securely fastened by the stopper v, as shown in Fig. 8.

To use the magazine, the clamp Q must be loosened and the portion L of the leg slipped out of the portion H.

While preferring the above-described methods of construction, I may vary it in any manner not departing from the spirit of my invention and the claims hereinafter made.

Having fully described my invention, that any one skilled in the manufacture of such articles may be able to build it and any artist to use it, what I claim as novel, and desire to secure by Letters Patent, is—

1. In a camera-tripod, the combination, with a standard, C, provided with a socket, n, and a nut, m, of a rod, E, a sliding head, F, upon the rod E, and brace-rods G, joining the sliding head F to the upper portion of the legs H with vertically-flexible joints, substantially as above specified.

2. The combination, in a camera-tripod having hollow extensible legs, of two sections, H and L, the section L being thereby adapted to be used for a magazine, with a coil-spring, X, and plate and stopper v, substantially for the purpose and in the manner above set forth.

WILLIAM HENERY CARPENTER.

Witnesses:
E. I. BOWEN,
L. E. FINN.